UNITED STATES PATENT OFFICE.

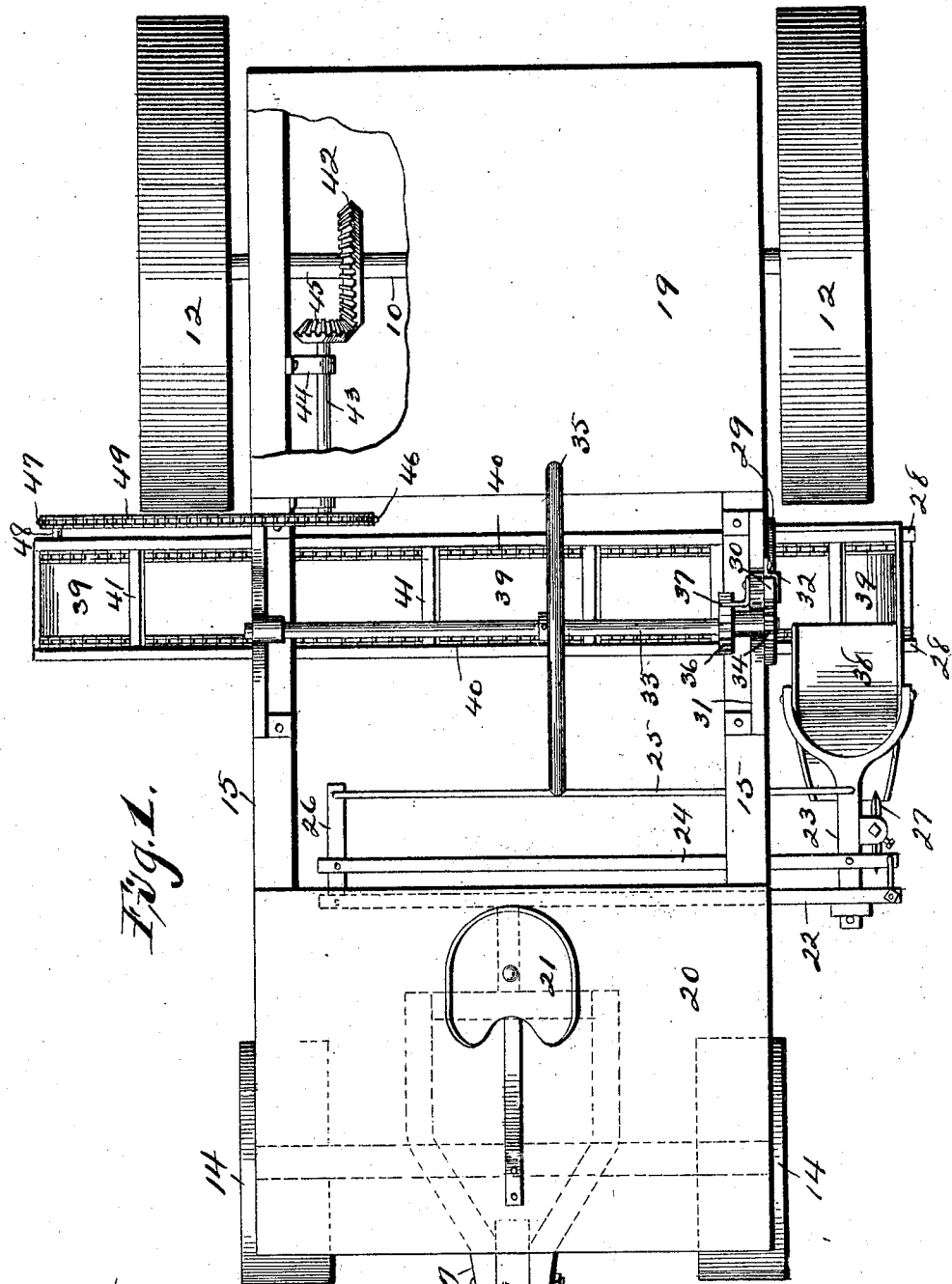

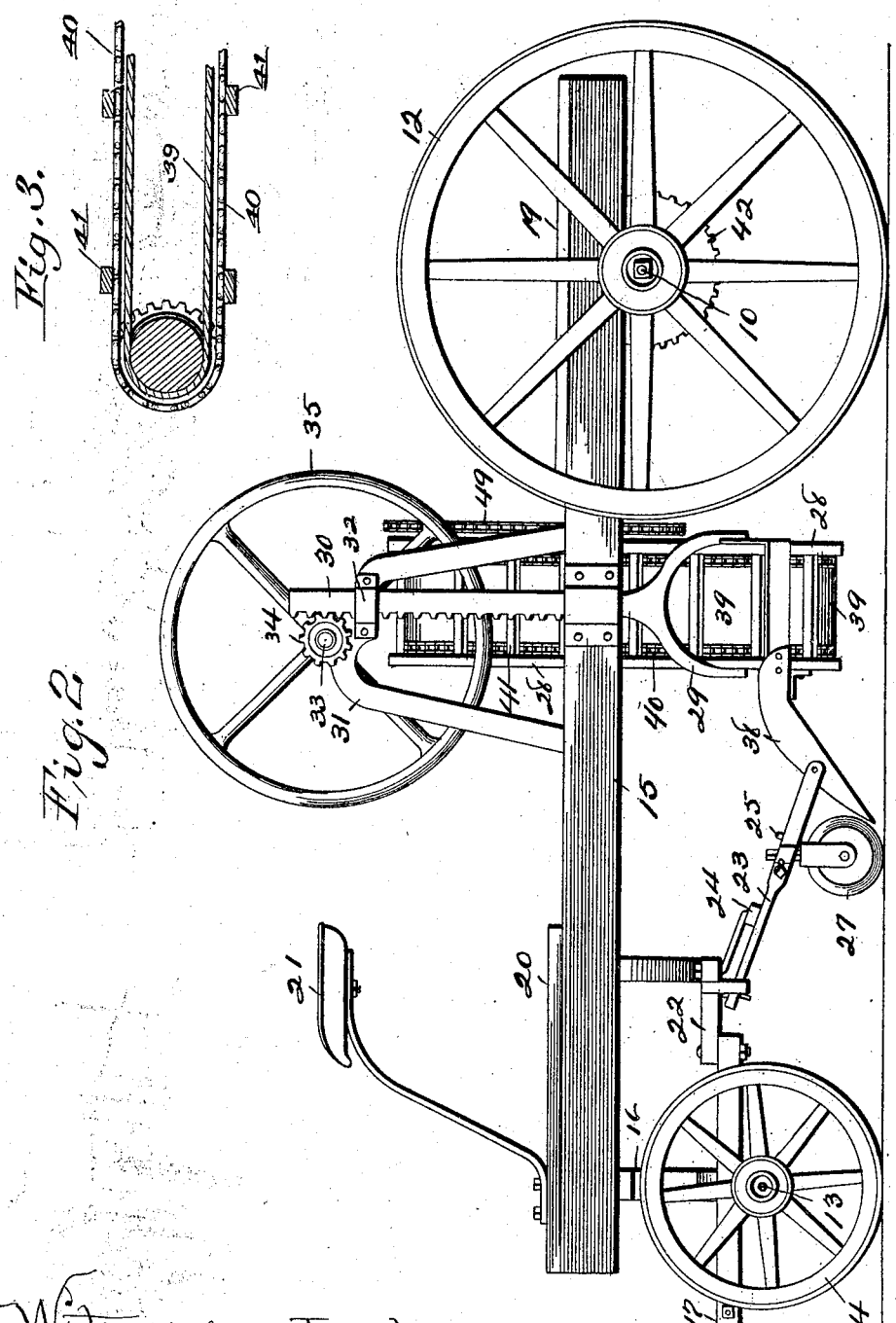

JOHN W. LANGFITT, OF ADEL, IOWA.

ROAD-GRADER.

No. 800,220.   Specification of Letters Patent.   Patented Sept. 26, 1905.

Application filed April 4, 1905. Serial No. 253,869.

*To all whom it may concern:*

Be it known that I, JOHN W. LANGFITT, a citizen of the United States, residing at Adel, in the county of Dallas and State of Iowa, have invented a new and useful Road-Grader, of which the following is a specification.

My object is to provide an improved machine specially adapted for moving ground from the sides and gutters of a roadway for grading the road by making it higher in the middle, as required to drain rain from the center into the gutters at its sides, and also adapted for excavating and loading ground in wagons advanced at the side of the machine when in operation, as required to avoid the manual labor and expense of shoveling ground into wagons.

My invention consists in the construction, arrangement, and combination of elements and subcombinations as hereinafter set forth, pointed out in my claims, and illustrated in the accompanying drawings, in which—

Figure 1 is a top view that shows the position of all the operative parts with which they are connected. Fig. 2 is a side elevation of the machine and the cutter and scoop and endless carriers for elevating ground and conveying laterally relative to the line of advance as required in practical use. Fig. 3 is a sectional detail view of an endless-belt carrier and endless-chain carrier that coact in elevating ground.

The numeral 10 designates the axle of the rear part of the carriage, and 12 designates wheels of large diameter mounted on the axle. The front axle 13 is shorter than the rear axle, and the wheels 14 mounted thereon are comparatively small in diameter relative to the rear wheel 12. A frame consisting of parallel sides 15 and cross-pieces fixed to their ends (not shown) is fixed direct on top of the rear axle in any suitable way and on a bolster 16 at its front end. Hounds 17 are fixed on the front axle 13 in any suitable way and the bolster 16 pivotally connected with the hounds by means of a cross-piece fixed between the hounds and a king-bolt (not shown) or in any suitable way to allow the front wheels 14 to be directed to the right or left as required to deflect the machine from a straight line of advance and to turn about. A pole 18 is fixed to the hounds to connect a doubletree and swingletrees therewith for hitching horses thereto.

A platform 19 is fixed on top of the rear end of the carriage-frame and a platform 20 upon the front end of the frame. A driver's seat 21 is mounted on the front platform. A frame 22 is pivotally connected with the center of the cross-bar at the rear end of the hounds 17 and a yoke 23 pivotally connected with the end of said frame that projects to one side of the machine, as shown in Fig. 1, to support a rotary cutter. An evener-bar 24 is pivotally connected with the ends of the frame or bar 22 and also pivotally connected with the arm of the yoke 23 and a rod 25 is also pivotally connected with arm of the yoke and the short bar 26 pivotally connected with the end of the transverse bar of the frame 22. Flexibility is thus provided in the connection of the yoke 23 with the machine, so the yoke will be self-adjusting relative to any deflection of the machine relative to a straight line of advance as required to govern a cutter or scoop that follows the cutter.

A frame 28 is suspended from the carriage-frame in front of the rear carriage-wheels 12 to extend crosswise and to incline from near the ground some distance above the carriage-frame, as shown in Fig. 2, in such a manner that its degree of angle relative to the ground or to wagons into which loose ground is to be conveyed can be raised. At its lower end it is pivotally connected with a yoke 29, that has an arm 30, that has teeth at one side edge to serve as a rack. A bearer-frame 31 is fixed to the carriage-frame and provided with a loop 32 to support the arm or rack 30, as shown in Fig. 2, and also to support a rotatable shaft 33, that has a pinion 34 on its end to engage the rack 30. A hand-wheel 35 is fixed to the shaft 33 for rotating it, as required to raise the lower end of the conveyer-frame 28, and a ratchet-wheel 36 is fixed on the shaft and a pawl 37 pivoted to the bearer 31, as shown in Fig. 1, as required for locking the shaft.

To the lower end of the conveyer-frame 28 is fixed a scoop 38, that is inclined downward and projects forward to scrape and elevate ground cut loose by the cutter 27 and to convey it to endless carriers mounted on the elevator-frame 28. An endless-belt carrier 39 is mounted on rollers journaled in the ends of the frame, and an endless-chain carrier 40, having cross-slats 41 fixed to the parallel chains, is mounted on top of the belt-carrier. To actuate the endless carriers, a bevel-gear drive-wheel 42 is fixed to the rear axle 10, a shaft 43, supported in bearers 44, fixed to the side 15 of the machine-frame and connected with wheel 42 by a gear-wheel 45, fixed to its end, as shown in Fig. 1. A sprocket-wheel 46 is fixed to the front end of the shaft 43 and another sprocket-wheel 47 fixed to the end of the shaft 48 of the roller at the upper end of the conveyer-frame 28 and the two sprocket-wheels connected by a chain 49, as required to transfer power and motion to the endless-belt carrier 39 and the endless-chain carrier 40 at the same time. The endless-belt carrier will prevent dirt from falling from the conveyer, and the endless-chain carrier will at all times by means of its cross-slats aid in elevating the ground that falls on the endless-belt carrier from the top of the scoop 38 while the machine is advancing and ground cut loose by the cutter 27, and when the belt-carrier slips on the rollers upon which it is mounted and remains stationary it will serve as an inclined plane upon which the slats of the chain-carrier will carry the loose ground up to fall from the top of the conveyer, as required to move the ground from the side of a road to its center or into a wagon advanced at the side of the machine.

Having thus set forth the purpose of my invention and the construction, function, arrangement, and combination of all its operative parts, the practical operation and utility thereof will be obvious to persons familiar with the art to which it pertains.

What I claim as new, and desire to secure by Letters Patent, is—

1. In a road-grader, a wheeled frame, a platform fixed on the rear end of the frame, a platform fixed on the front end of the frame, a cutter-carrier and a rotary cutter flexibly connected with the rear of the hounds and a scoop pivotally connected with the cutter-carrier, to operate in the manner set forth, for the purposes stated.

2. In a road-grader, a wheeled frame, a platform fixed on the rear end of the frame, a platform fixed on the front end of the frame, a cutter-carrier and a rotary cutter flexibly connected with the rear of the hounds and a scoop pivotally connected with the cutter-carrier and adjustably connected with the wheeled frame, to operate in the manner set forth, for the purposes stated.

3. In a road-grader, a wheeled frame, a platform fixed on the rear end of the frame, a platform fixed on the front end of the frame, a cutter-carrier and a rotary cutter flexibly connected with the rear of the hounds, a scoop pivotally connected with the cutter-carrier, a conveyer-frame suspended from the frame in front of the rear carriage-wheels and connected with the rear end of the scoop to project upward and transversely to the frame and means for raising and lowering the conveyer-frame, arranged and combined to operate in the manner set forth for the purposes stated.

4. In a road-grader, a wheeled frame, a platform fixed on the rear end of the frame, a platform fixed on the front end of the frame, a cutter-carrier and a rotary cutter flexibly connected with the rear of the hounds, a scoop pivotally connected with the cutter-carrier, a conveyer-frame suspended from the frame in front of the rear carriage-wheels and connected with the rear end of the scoop for raising and lowering the conveyer-frame and an endless-belt carrier mounted on the conveyer-frame, arranged and combined to operate in the manner set forth, for the purposes stated.

5. In a road-grader, a wheeled frame, a platform fixed on the rear end of the frame, a platform fixed on the front end of the frame, a cutter-carrier and a rotary cutter flexibly connected with the rear of the hounds, a scoop pivotally connected with the cutter-carrier, a conveyer-frame suspended from the frame in front of the rear carriage-wheels and connected with the rear end of the scoop for raising and lowering the conveyer-frame, an endless-belt carrier mounted on the conveyer-frame and an endless-chain carrier on the endless-belt carrier, arranged and combined to operate in the manner set forth for the purposes stated.

6. In a road-grader, a wheeled frame, a platform fixed on the rear end of the frame, a platform fixed on the front end of the frame, a cutter-carrier and a rotary cutter flexibly connected with the rear of the hounds, a scoop pivotally connected with the cutter-carrier, a conveyer-frame suspended from the frame in front of the rear carriage-wheels and connected with the rear end of the scoop for raising and lowering the conveyer-frame, an endless-belt carrier mounted on the conveyer-frame, an endless-chain carrier on the endless-belt carrier, a yoke pivotally connected with the conveyer-frame and having an arm with teeth on its edge and slidably connected with the carriage-frame, arranged and combined to operate in the manner set forth, for the purposes stated.

7. In a road-grader, a conveyer-frame suspended from the carriage-frame, a yoke pivotally connected with the lower end portion of the conveyer-frame and having an arm slidably connected with the carriage-frame and provided with teeth at its edge, a rotatable shaft mounted in bearers fixed on top of the carriage-frame and provided with a fixed pinion to engage the toothed arm of the yoke and means for manually rotating said shaft, arranged and combined as shown and described for the purposes stated.

8. In a road-grader, a conveyer-frame suspended from the carriage-frame, a yoke pivotally connected with the lower end portion of the conveyer-frame and having an arm slidably connected with the carriage-frame and provided with teeth at its edge, a rotatable shaft mounted in bearers fixed on top of the carriage-frame and provided with a fixed pinion to engage the toothed arm of the yoke and means for manually rotating said shaft, an endless-belt carrier mounted on rollers in the ends of the conveyer-frame, an endless-chain carrier mounted on top of the belt-carrier and means for actuating the two carriers, arranged and combined to operate in the manner set forth for the purposes stated.

9. In a road-grader, a conveyer-frame suspended from the carriage-frame, a yoke pivotally connected with the lower end portion of the conveyer-frame and having an arm slidably connected with the carriage-frame and provided with teeth at its edge, a rotatable shaft mounted in bearers fixed on top of the carriage-frame and provided with a fixed pinion to engage the toothed arm of the yoke and means for manually rotating said shaft, an endless-belt carrier mounted on rollers in the ends of the conveyer-frame, an endless-chain carrier mounted on top of the belt-carrier, a gear-wheel fixed to the rear carriage-axle, a shaft in bearings fixed to the carriage-frame and connected with said gear-wheel on the axle by a gear-wheel on its end, a sprocket-wheel on the end of said shaft, a sprocket-wheel on the upper end of the conveyer-frame and the two sprocket-wheels connected by a chain, arranged and combined to operate in the manner set forth, for the purposes stated.

JOHN W. LANGFITT.

Witnesses:
R. G. ORWIG,
THOMAS G. ORWIG.